United States Patent
Balachandran et al.

(10) Patent No.: US 10,809,935 B2
(45) Date of Patent: Oct. 20, 2020

(54) SYSTEM AND METHOD FOR MIGRATING TREE STRUCTURES WITH VIRTUAL DISKS BETWEEN COMPUTING ENVIRONMENTS

(71) Applicant: VMware, Inc., Palo Alto, CA (US)

(72) Inventors: Vipin Balachandran, Cupertino, CA (US); Hemanth Kumar Pannem, Cupertino, CA (US)

(73) Assignee: VMware, Inc., Palo Alto, CA (US)

(*) Notice: Subject to any disclaimer, the term of this patent is extended or adjusted under 35 U.S.C. 154(b) by 121 days.

(21) Appl. No.: 16/223,081

(22) Filed: Dec. 17, 2018

(65) Prior Publication Data

US 2020/0192594 A1    Jun. 18, 2020

(51) Int. Cl.
*G06F 9/455* (2018.01)
*G06F 3/06* (2006.01)
*G06F 16/22* (2019.01)

(52) U.S. Cl.
CPC .......... *G06F 3/0647* (2013.01); *G06F 3/0604* (2013.01); *G06F 3/067* (2013.01); *G06F 3/0664* (2013.01); *G06F 16/2246* (2019.01)

(58) Field of Classification Search
CPC .................................................. G06F 9/45533
USPC ........................................................... 718/1
See application file for complete search history.

(56) References Cited

U.S. PATENT DOCUMENTS

| | | | | |
|---|---|---|---|---|
| 7,941,470 B2* | 5/2011 | Le | .................. | G06F 3/0607 708/208 |
| 8,296,759 B1* | 10/2012 | Hutchins | ............. | G06F 9/45558 709/223 |
| 8,478,801 B2* | 7/2013 | Hutchins | ................. | G06F 16/16 707/829 |
| 9,189,342 B1* | 11/2015 | von Thenen | ........ | G06F 9/45558 |
| 10,025,509 B2* | 7/2018 | Green | .................... | G06F 3/0619 |
| 10,055,309 B1* | 8/2018 | Samad | ................ | G06F 9/45558 |
| 10,275,321 B1* | 4/2019 | Bajaj | .................... | G06F 9/45558 |
| 2009/0037680 A1* | 2/2009 | Colbert | ................. | G06F 3/0617 711/162 |
| 2009/0216975 A1* | 8/2009 | Halperin | ................. | H04L 67/10 711/162 |
| 2010/0049930 A1* | 2/2010 | Pershin | ............... | G06F 11/1451 711/162 |
| 2010/0299368 A1* | 11/2010 | Hutchins | ................. | G06F 16/16 707/803 |

(Continued)

*Primary Examiner* — Mehran Kamran
(74) *Attorney, Agent, or Firm* — Loza & Loza, LLP

(57) ABSTRACT

System and computer-implemented method for migrating a tree structure with multiple virtual disks and multiple virtual computing instances from a source computing environment to a destination computing environment involves handling leaf and shared virtual disks of the tree structure differently on a level-by-level basis to produce a replicated tree structure in the destination computing environment. For a leaf virtual disk, the leaf virtual disk and a virtual computing instance attached to the leaf virtual disk are replicated in the destination computing environment. For a shared virtual disk, creating a dummy virtual computing instance is created in the source computing environment and the shared virtual disk and the dummy virtual computing instance are replicated in the destination computing environment. Any dummy virtual computing instances replicated in the destination computing environment for the migration can then be removed.

20 Claims, 11 Drawing Sheets

(56) References Cited

U.S. PATENT DOCUMENTS

| | | | | |
|---|---|---|---|---|
| 2012/0324183 | A1* | 12/2012 | Chiruvolu | G06F 11/2038 711/162 |
| 2013/0263119 | A1* | 10/2013 | Pissay | G06F 9/45558 718/1 |
| 2014/0250093 | A1* | 9/2014 | Prahlad | G06F 16/2272 707/696 |
| 2014/0325170 | A1* | 10/2014 | Aswathanarayana | G06F 11/1471 711/162 |
| 2015/0127833 | A1* | 5/2015 | Hegdal | G06F 9/5016 709/226 |
| 2015/0169355 | A1* | 6/2015 | Huang | G06F 3/0604 718/1 |
| 2016/0034290 | A1* | 2/2016 | Christenson | G06F 9/45558 718/1 |
| 2016/0110434 | A1* | 4/2016 | Kakaraddi | G06F 11/3006 707/602 |
| 2016/0170788 | A1* | 6/2016 | Tarasuk-Levin | G06F 9/4401 718/1 |
| 2017/0316030 | A1* | 11/2017 | Shetty | G06F 11/2076 |
| 2018/0150312 | A1* | 5/2018 | Gupta | G06F 9/45558 |
| 2018/0150320 | A1* | 5/2018 | Koskinen | G06F 11/1448 |
| 2018/0157422 | A1* | 6/2018 | Greer | G06F 11/3409 |
| 2018/0181308 | A1* | 6/2018 | Kamiura | G06F 11/1451 |
| 2019/0034087 | A1* | 1/2019 | Renauld | G06F 3/0664 |
| 2019/0250997 | A1* | 8/2019 | Karasev | G06F 9/45558 |
| 2019/0370120 | A1* | 12/2019 | Bajaj | G06F 16/128 |
| 2020/0026618 | A1* | 1/2020 | Bansal | G06F 11/1469 |
| 2020/0042396 | A1* | 2/2020 | Desai | G06F 3/0664 |

\* cited by examiner

SYSTEM AND METHOD FOR MIGRATING TREE STRUCTURES WITH VIRTUAL DISKS BETWEEN COMPUTING ENVIRONMENTS

BACKGROUND

Cloud architectures are used in cloud computing and cloud storage systems for offering infrastructure-as-a-service (IaaS) cloud services. Examples of cloud architectures include the VMware Cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual computing instances (VCIs), e.g., virtual machines (VMs), and logical networks.

A hybrid cloud system aggregates the resource capability from both private and public clouds. A private cloud can include one or more customer data centers (referred to herein as "on-premise data centers"). The public cloud can include a multi-tenant cloud architecture providing IaaS cloud services. In a hybrid cloud system, it is desirable to support VCI migration between the on-premise data centers and/or the public cloud for various reasons, such as workload management. In some instances, VCIs being migrated may share one or more virtual disks with other VCIs that are also being migrated. For these types of VCIs, multiple redundant virtual disks may have to be replicated at their destinations for the VCI migration, which will require significant computational and network resources.

SUMMARY

System and computer-implemented method for migrating a tree structure with multiple virtual disks and multiple virtual computing instances from a source computing environment to a destination computing environment involves handling leaf and shared virtual disks of the tree structure differently on a level-by-level basis to produce a replicated tree structure in the destination computing environment. For a leaf virtual disk, the leaf virtual disk and a virtual computing instance attached to the leaf virtual disk are replicated in the destination computing environment. For a shared virtual disk, creating a dummy virtual computing instance is created in the source computing environment and the shared virtual disk and the dummy virtual computing instance are replicated in the destination computing environment. Any dummy virtual computing instances replicated in the destination computing environment for the migration can then be removed.

A computer-implemented method for migrating a tree structure with multiple virtual disks and multiple virtual computing instances from a source computing environment to a destination computing environment in accordance with an embodiment of the invention comprises sequentially selecting each level of the tree structure to be processed, for each leaf virtual disk on a selected level of the tree structure, replicating the leaf virtual disk and a virtual computing instance attached to the leaf virtual disk in the destination computing environment, for each shared virtual disk on the selected level of the tree structure, creating a dummy virtual computing instance in the source computing environment and replicating the shared virtual disk and the dummy virtual computing instance in the destination computing environment, and after all levels of the tree structure have been processed, removing any dummy virtual computing instances replicated in the destination computing environment for the tree structure to produce a replicated tree structure in the destination computing environment. In some embodiments, the steps of this method are performed when program instructions contained in a computer-readable storage medium are executed by one or more processors.

A system of multiple computing environments having a tree structure with multiple virtual disks and multiple virtual computing instances comprises memory and one or more processors configured to sequentially select each level of the tree structure to be processed for migration from a source computing environment to a destination computing environment, for each leaf virtual disk on a selected level of the tree structure, replicate the leaf virtual disk and a virtual computing instance attached to the leaf virtual disk in the destination computing environment, for each shared virtual disk on the selected level of the tree structure, create a dummy virtual computing instance in the source computing environment and replicating the shared virtual disk and the dummy virtual computing instance in the destination computing environment, and after all levels of the tree structure have been processed, remove any dummy virtual computing instances replicated in the destination computing environment for the tree structure to produce a replicated tree structure in the destination computing environment.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
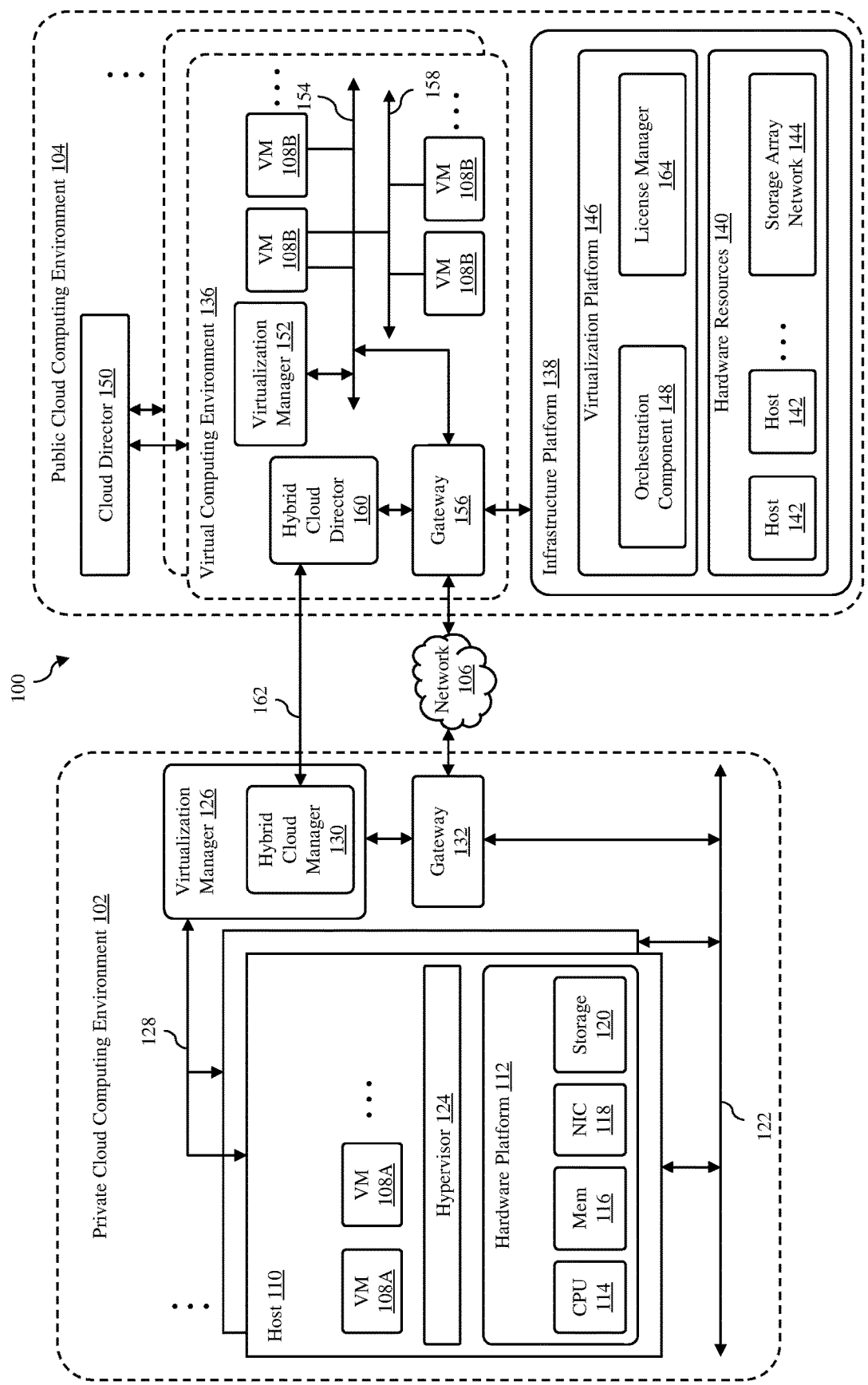
FIG. 1 is a block diagram of a hybrid cloud system in accordance with an embodiment of the invention.

Turning now to FIG. 1, a block diagram of a hybrid cloud system 100 in accordance with an embodiment of the invention is shown. The hybrid cloud system 100 includes at least one private cloud computing environment 102 and at least one public cloud computing environment 104 that are connected via a network 106. The hybrid cloud system 100 is configured to provide a common platform for managing and executing workloads seamlessly between the private and public cloud computing environments. In one embodiment, the private cloud computing environment 102 may be controlled and administrated by a particular enterprise or business organization, while the public cloud computing environment 104 may be operated by a cloud computing service provider and exposed as a service available to account holders, such as the particular enterprise in addition to other enterprises. In some embodiments, the private cloud computing environment 102 may be a private or on-premise data center.

The private and public cloud computing environments 102 and 104 of the hybrid cloud system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

As explained below, the hybrid cloud system 100 supports migration of the virtual machines 108 between the private and public cloud computing environments 102 and 104. The hybrid cloud system 100 may also support migration of the virtual machines 108 between different sites situated at different physical locations, which may be computing environments in the private and/or public cloud computing environments.

As shown in FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions, for example, executable instructions that perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a network 122 within the private cloud computing environment. The network interface 118 may be one or more network adapters, also referred to as a Network Interface Card (NIC). The storage system 120 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host.

Each host 110 may be configured to provide a virtualization layer that abstracts processor, memory, storage and networking resources of the hardware platform 112 into the virtual computing instances, e.g., the virtual machines 108A, that run concurrently on the same host. The virtual machines run on top of a software interface layer, which is referred to herein as a hypervisor 124, that enables sharing of the hardware resources of the host by the virtual machines. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with the hosts 110 via a management network 128. In an embodiment, the virtualization manager 126 is a computer program that resides and executes in a computer system, such as one of the hosts, or in a virtual computing instance, such as one of the virtual machines 108A running on the hosts. One example of the virtualization manager 126 is the VMware vCenter Server® product made available from VMware, Inc. The virtualization manager is configured to carry out administrative tasks for the private cloud computing environment, including managing the hosts, managing the VMs running within each host, provisioning VMs, migrating VMs from one host to another host, and load balancing between the hosts.

In one embodiment, the virtualization manager 126 includes a hybrid cloud manager 130 configured to manage and integrate computing resources provided by the private cloud computing environment 102 with computing resources provided by the public cloud computing environment 104 to form a unified "hybrid" computing platform. The hybrid cloud manager is configured to deploy virtual computing instances, e.g., virtual machines 108A, in the private cloud computing environment, transfer VMs from the private cloud computing environment to the public cloud computing environment, and perform other "cross-cloud" administrative tasks. In one implementation, the hybrid cloud manager 130 is a module or plug-in to the virtualization manager 126, although other implementations may be used, such as a separate computer program executing in any computer system or running in a virtual machine in one of the hosts. One example of the hybrid cloud manager 130 is the VMware® HCX™ product made available from VMware, Inc.

In one embodiment, the hybrid cloud manager 130 is configured to control network traffic into the network 106 via a gateway device 132, which may be implemented as a virtual appliance. The gateway device 132 is configured to provide the virtual machines 108A and other devices in the private cloud computing environment 102 with connectivity to external devices via the network 106. The gateway device 132 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

The public cloud computing environment 104 of the hybrid cloud system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the virtual machines 108B across the hosts 142. The virtualization platform may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment 104 may be VMware cloud (VMC) on Amazon Web Services (AWS).

In one embodiment, at least some of the virtual computing environments 136 may be configured as virtual data centers. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one networking gateway device 156, as well as one or more isolated internal networks 158 not connected to the gateway device 156. The gateway device 156, which may be a virtual appliance, is configured to provide the virtual machines 108B and other components in the virtual computing environment 136 with connectivity to external devices, such as components in the private cloud computing environment 102 via the network 106. The gateway device 156 operates in a similar manner as the gateway device 132 in the private cloud computing environment.

In one embodiment, each virtual computing environments 136 includes a hybrid cloud director 160 configured to communicate with the corresponding hybrid cloud manager 130 in the private cloud computing environment 102 to enable a common virtualized computing platform between the private and public cloud computing environments. The hybrid cloud director may communicate with the hybrid cloud manager using Internet-based traffic via a VPN tunnel established between the gateways 132 and 156, or alternatively, using a direct connection 162. The hybrid cloud director and the corresponding hybrid cloud manager facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration. As an example, the hybrid cloud director 160 may be a component of the HCX-Cloud product and the hybrid cloud manager 130 may be a component of the HCX-Enterprise product, which are provided by VMware, Inc.

In some situations, a large number of virtual computing instances may have to be migrated between the private and public cloud computing environments 102 and 104, for example, due to changes in workload demands. However, some of these virtual computing instances may share one or more common virtual disks that are used for data storage. As an example, such virtual computing instances may be linked clones, which are virtual machine clones that use one or more shared read-only virtual disks with other virtual machines. Linked clones are created using a technique called linked cloning, which is a VMware vSphere® technology used for fast provisioning of virtual machines. Linked cloning allows multiple virtual machines to share a single read-only virtual disk. Any modifications to such a read-only shared virtual disk by a virtual machine are written to a redo log, which is also known as a delta virtual disk. The delta virtual disk and the shared virtual disk have a parent-child relationship, where the shared virtual disk can be viewed as the parent disk and the delta virtual disk can be viewed as the child disk. In this parent-child relationship, for any read operation, data is first read from the child disk, and if there is a miss, the read operation is attempted on the parent disk. It is also possible to create a linked clone of an existing linked clone. In such a case, the current virtual disk of the existing linked clone is marked read-only and a new child virtual disk is created for the current virtual disk, which is then used by the new linked clone. The creation of these linked clones results in a group of virtual machines with potentially multiple parent-child relationships between the various virtual disks used by the virtual machines. Such a group of virtual machines with shared virtual disks can be referred to as a linked clone tree structure. Linked cloning is used by VMware cloud solutions, such as VMware® vCloud Director® (vCD), VMware Integrated OpenStack (VIO) and VMware® Horizon®, for fast provisioning of virtual machines.

Since these VMware solutions use linked cloning of virtual machines for fast provisioning, it is possible to have thousands of linked clone tree structures especially for a cloud with a large user base. Due to workload demands, there may be times when all or a subset of virtual machines in a linked clone tree structure needs to be migrated between a private cloud and a public cloud, such as between the private cloud computing environment 102 and the public cloud computing environment 104. For this type of migration, a hybrid cloud solution such as VMware® HCX™ product can be used. One of the main challenges in migrating a linked clone tree structure is to preserve the tree structure (i.e., parent-child relationships) intact. This is necessary due to the following reasons:

A) Linked clones result in reduced storage consumption. Consider the case of spawning 1000 virtual machines from the same OS image. In this case, linked clones can reduce the storage consumption significantly compared to full clones, which are complete copies of virtual machines, including their virtual disks.

B) The migration will be efficient if the tree structure is retained. Once the parent virtual disk is migrated, only the redo logs or delta virtual disks, which are often smaller in size than the read-only shared virtual disks, need to be migrated.

However, solutions like VMware® HCX™ product often perform cross-cloud/cross-site migration using VMware vSphere® replication. For such a migration, given a source virtual machine, a virtual machine similar in specification to the source virtual machine is created at the destination and is marked as the target of vSphere replication. Once the replication is done, the source virtual machine is powered-off and the target virtual machine is powered on. This kind of migration using vSphere replication flattens the tree structure, as explained in more detail below.

Figure 2:
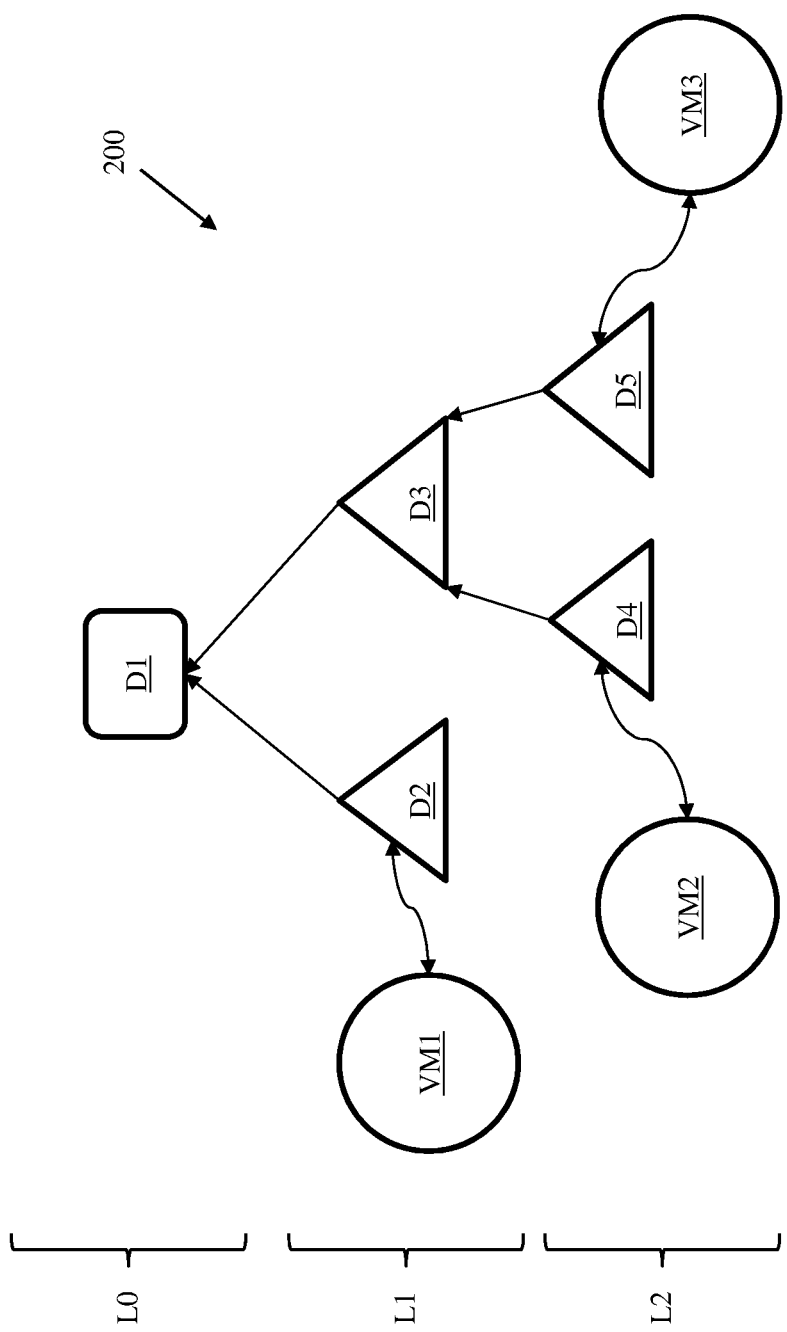
FIG. 2 is a diagram of a linked clone tree structure in accordance with an embodiment of the invention.

FIG. 2 shows a linked clone tree structure 200 with three virtual machines VM1, VM2 and VM3 that is to be transferred from one virtual computing environment to another, for example, from the private cloud computing environment 102 to the public cloud environment 104. The linked clone tree structure 200 includes three levels of storage virtual disks, level 0 L0, level 1 L1 and level 2 L2. On level 0, there is only the root virtual disk D1 of the linked clone tree structure. On level 1, there are two virtual disks D2 and D3, and a virtual machine VM1, which is associated with the virtual disk D2. On level 2, there are two virtual disks D4 and D5 and two virtual machines VM2 and VM3, which are associated with the virtual disks D4 and D5, respectively. The virtual disks D1-D5 can be viewed as being nodes of the linked clone tree structure. Each of these virtual disks D1-D5 may be a leaf virtual disk or a shared virtual disk. A shared virtual disk is a read-only virtual disk that is a parent of at least one leaf virtual disk and is being shared by multiple virtual machines. A leaf virtual disk is a re-do log or a delta virtual disk that has one shared virtual disk as the parent and is used by a single virtual machine.

In the linked clone tree structure 200, the root virtual disk D1 has child virtual disks D2 and D3. Thus, the root virtual disk D1 is a shared virtual disk. The virtual disk D2 does not have any child virtual disks. Thus, the virtual disk D2 is a leaf virtual disk, which is being used as a delta virtual disk for the virtual machine VM1. Since the virtual disk D2 is a child disk of the root virtual disk D1, the virtual machine VM1 uses the virtual disk D2 and the shared root virtual disk D1. The virtual disk D3 has child virtual disks D4 and D5. Thus, the root virtual disk D3 is a shared virtual disk. The virtual disk D4 does not have any child virtual disks. Thus, the virtual disk D4 is a leaf virtual disk, which is being used as a delta virtual disk for the virtual machine VM2. Since the virtual disk D4 is a child disk of the virtual disk D3, which is a child disk of the root virtual disk D1, the virtual machine VM2 uses the virtual disk D4 and the shared virtual disks D1 and D3. The virtual disk D5 also does not have any child virtual disks. Thus, the virtual disk D5 is also a leaf virtual disk, which is being used as a delta virtual disk for the virtual machine VM3. Since the virtual disk D5 is a child disk of the virtual disk D3, which is a child disk of the root virtual disk D1, the virtual machine VM3 uses the virtual disk D5 and the shared virtual disks D1 and D3.

The linked clone tree structure 200 can be created by the following sequence of operations on the virtual machine VM1 with a single virtual disk, i.e., the virtual disk D1 before it becomes a shared read-only virtual disk: a) create a linked clone of the virtual machine VM1 to produce the virtual machine VM2, which turns the virtual disk D1 into a shared read-only virtual disk and creates the virtual disks D2 and D3, which are both delta virtual disks, and b) create a linked clone of the virtual machine VM2 to produce the virtual machine VM3, which turns the virtual disk D3 into a shared read-only virtual disk and creates the virtual disks D4 and D5, which are both delta virtual disks.

Figure 3A:
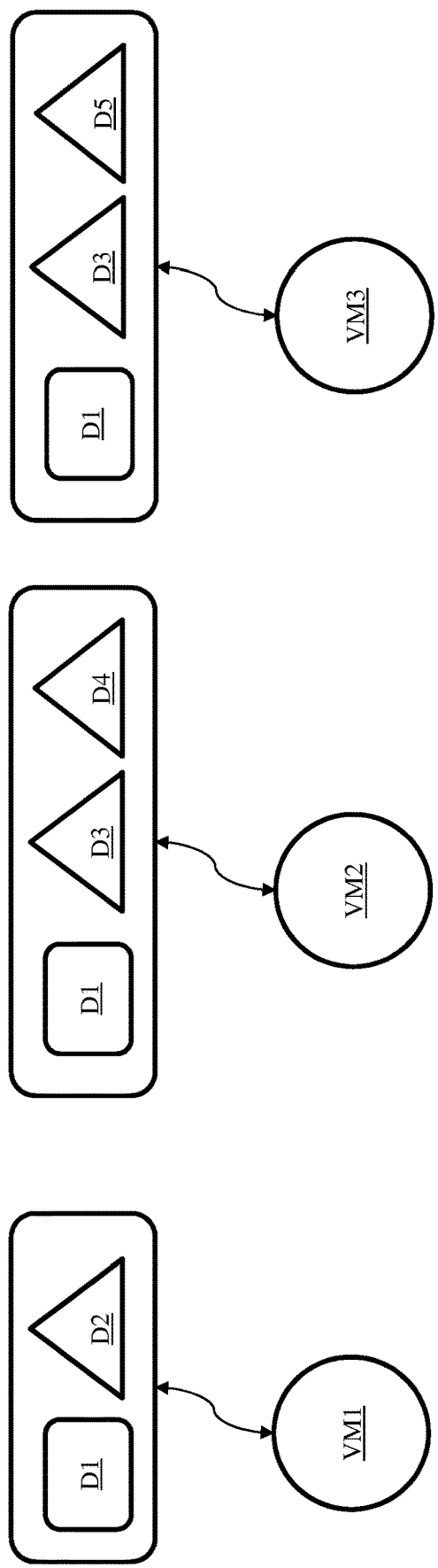
FIG. 3A illustrates a linked clone tree structure that has been migrated in which the parent-child virtual disk hierarchy of the linked clone tree structure has been flatten by the migration process.

Using conventional methods of virtual machine migration, if the linked clone tree structure 200 is migrated from one virtual computing environment to another, for example, from the private cloud computing environment 102 to the public cloud environment 104, the linked clone tree structure will be flattened in the process. That is, the parent-child virtual disk hierarchy of the linked clone tree structure will be lost. In addition, the shared virtual disks of the linked clone tree structure will be replicated repeatedly for the virtual machines VM1, VM2 and VM3. This is due to the fact that for conventional virtual machine replication, all the virtual disks associated with and used by each virtual machine will be replicated at the destination. Thus, in the case of the linked clone tree structure 200, the virtual disks D1 and D2 will be replicated at the destination to replicate the virtual machine VM1, the virtual disks D1, D3 and D4 will be replicated at the destination to replicate the virtual machine VM2, and the virtual disks D1, D3 and D5 will be replicated at the destination to replicate the virtual machine VM3, as illustrated in FIG. 3A. Such a process involves replicating the virtual disk D1 at the destination three times for the virtual machines VM1, VM2 and VM3 and replicating the virtual disk D3 at the destination twice for the virtual machines VM2 and VM3. In addition, the parent-child virtual disk hierarchy of the linked clone tree structure 200 will be lost at the destination.

Figure 3B:
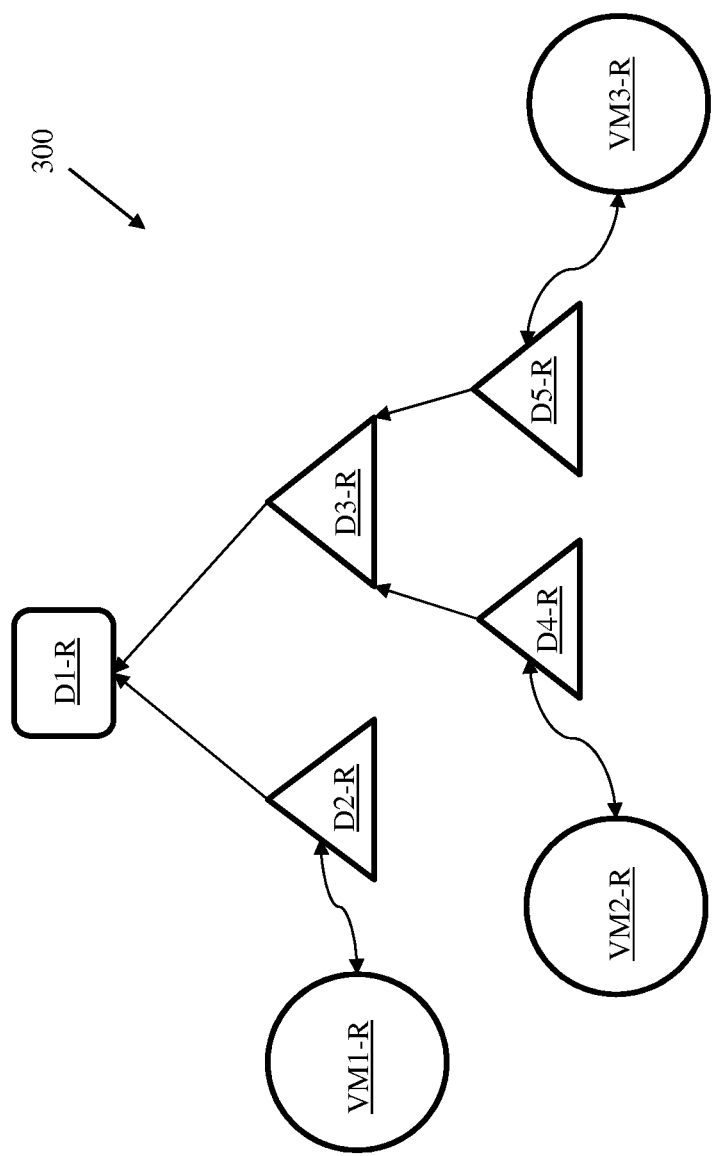
FIG. 3B illustrates a linked clone tree structure that has been migrated in which the parent-child virtual disk hierarchy of the linked clone tree structure has been preserved by the migration process in accordance with an embodiment of the invention.

In contrast, the hybrid cloud system 100 is able to migrate a linked clone structure, such as the linked clone tree structure 200, to the destination without repeatedly replicating the shared virtual disks of the linked clone tree structure. In addition, the hybrid cloud system 100 is able to preserve the parent-child virtual disk hierarchy of the linked clone tree structure at the destination, as illustrated in FIG. 3B, which shows a migrated linked clone tree structure 300 at the destination, e.g., the public cloud computing environment 104. The migrated linked clone tree structure 300 has the same parent-child virtual disk hierarchy as the original linked clone tree structure 200. However, the virtual disks in the migrated linked clone tree structure 300 are replicated virtual disks of the virtual disks D1-D5 of the original linked clone tree structure 200, and thus, labeled as D1-R to D5-R in FIG. 3B. In addition, the virtual machines in the migrated linked clone tree structure 300 are the virtual machines VM1, VM2 and VM3 of the original linked clone tree structure 200 that have been replicated, and thus, labeled as VM1-R, VM2-R and VM3-R.

In an embodiment, the hybrid cloud system 100 is able to migrate linked clone tree structures between virtual computing environments without redundantly replicating shared virtual disks of the linked clone tree structures and maintaining parent-child virtual disk hierarchies of the linked clone tree structures by replicating virtual disks of the linked clone tree structures on a level-by-level basis. In order to achieve such migrations, shared virtual disks and delta virtual disks of linked clone tree structures are handled differently to ensure that the linked clone tree structures are migrated in an efficient manner and parent-child virtual disk hierarchies of the linked clone tree structures are preserved at the destination environments.

In an embodiment, when a shared virtual disk of a linked clone tree structure needs to be replicated at the destination environment, a dummy virtual machine is created at the source environment and attached to the shared virtual disk. As used herein, a dummy virtual machine is a temporary virtual machine that is used for the purpose of migrating a linked clone tree structure. A dummy virtual machine may be created with bare minimum specification, such as minimal compute and memory resources. The dummy virtual machine is then replicated in the destination environment using a replication process, such as vSphere replication, which also replicates the shared virtual disk in the destination environment. If the shared virtual disk is the root virtual disk, the shared virtual disk is replicated as a new replicated virtual disk at the destination environment. However, if the shared virtual disk is not the root virtual disk, i.e., has a parent virtual disk, a child virtual disk backing file of the replicated parent virtual disk, which is a replica or a replicated version of the parent virtual disk for the shared virtual at the destination environment, is created at the destination environment. As used herein a child virtual disk backing file of a virtual disk is a file to be used for a child virtual disk for that virtual disk. The child virtual disk backing file is then used as a target of the replication of the shared virtual disk at the destination environment, which replicates the shared virtual disk at the destination environment, as well as preserve the parent-child virtual disk relationship for the shared virtual disk with its parent virtual disk.

In an embodiment, when a delta virtual disk of a linked clone tree structure needs to be replicated at the destination environment, a child virtual disk backing file of a replicated parent virtual disk, which is a replica or a replicated version of the parent virtual disk for the delta virtual disk at the destination environment, is created at the destination environment. The virtual machine attached to the delta virtual disk is then replicated at the destination environment, using a virtual machine replication process, such as vSphere replication, with the child virtual disk backing file being a target of the replication of the delta virtual disk, which migrates the virtual machine and also replicates the delta virtual disk at the destination environment using the delta virtual disk backing file. As a result, the parent-child virtual disk relationship for the shared virtual disk with its parent virtual disk is preserved at the destination environment.

By handling shared and delta virtual disks of a linked clone tree structure in the manner described above, the linked clone tree structure can be migrated from a source environment to a destination environment in an efficient manner and maintain the parent-child virtual disk hierarchy of the linked clone tree structures at the destination environment.

An operation for migrating a linked clone tree structure between the private cloud computing environment 102 and the public cloud environment 104 in accordance with an embodiment of the invention is described with reference to a process flow diagram shown in FIG. 4. In this description, the linked clone tree structure is being migrated from the private cloud computing environment 102 to the public cloud computing environment 104. However, a similar operation can be executed for migrating a linked clone tree structure from the public cloud environment 104 to the private cloud computing environment 102. Both of these types of operation are performed by the hybrid cloud manager 130 in the private cloud computing environment 102 and the hybrid cloud director 160 in the public cloud computing environment 104. In addition, a similar operation can be executed for migrating a linked clone tree structure between two private cloud computing environments 102 or between two virtual computing environments 136 in the public cloud computing environment 104. These types of operation are performed by the hybrid cloud managers 130 in the private cloud computing environments 102 or the hybrid cloud directors 160 in the virtual computing environments 136.

Figure 4:
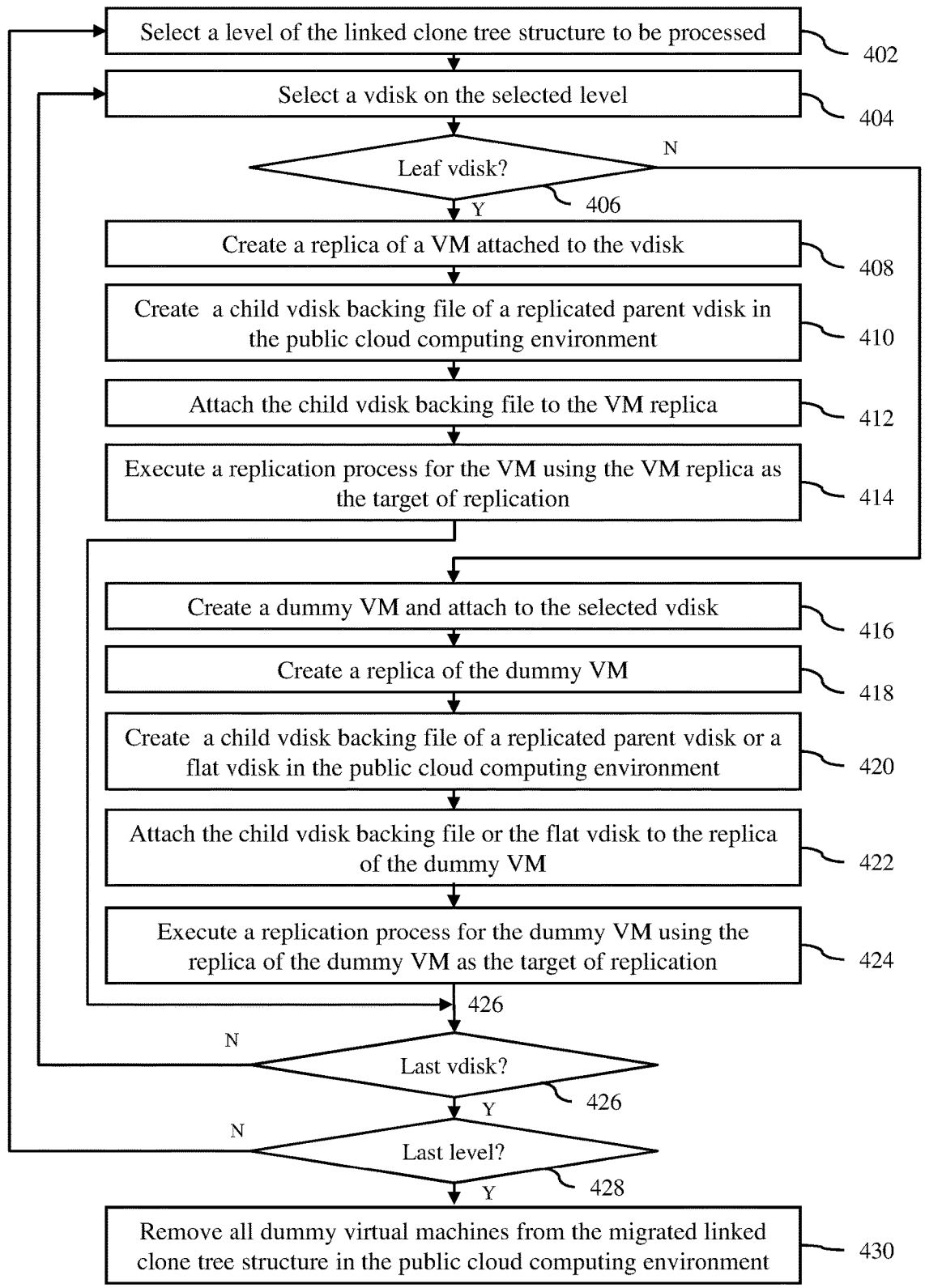
FIG. 4 is a flow diagram of an operation for migrating a linked clone tree structure between a private cloud computing environment and a public cloud environment in accordance with an embodiment of the invention.

As illustrated in FIG. 4, the migration operation begins at block 402, where a level of the linked clone tree structure is selected to be processed. Initially, the level selected is the level 0, which includes the root virtual disk of the linked clone tree structure. In any subsequent iterations of this step, the level selected would be a level of the linked clone tree structure higher in number than the previous level. Next, at block 404, a virtual disk ("vdisk" in FIG. 4) on the selected level of the linked clone tree structure is selected. In an embodiment, one of the virtual disks on the current level may be selected at random or based on some identifiers of the virtual disks, e.g., designated names, serial numbers or labels of the virtual disks.

Next at block 406, a determination is made whether the selected virtual disk is a leaf virtual disk. If yes, then the operation proceeds to block 408, a replica or an identical copy of a virtual machine attached to the selected virtual disk is created in the public cloud computing environment 104. Next, at block 410, a child virtual disk backing file of a replicated parent virtual disk, which is a replicated version of the parent virtual disk for the current virtual disk, is created in the public cloud computing environment 104. Next, at block 412, the child virtual disk backing file is attached to the replica of the virtual machine attached to the selected virtual disk.

Next, at block 414, a replication process is executed for the virtual machine in the private cloud computing environment 102 using the replica of the virtual machine as the target of replication, which results in the selected virtual disk attached to the virtual machine being replicated in the child virtual disk backing file in the public cloud computing environment 104. Thus, the child virtual disk backing file becomes the target of replication for the selected virtual disk. In an embodiment, a vSphere replication may be used as the replication process. As a result, the virtual machine attached to the selected virtual disk is migrated to the public cloud computing environment 104, and the selected virtual disk is replicated at the public cloud computing environment 104. Since the selected virtual disk was replicated using the child virtual disk backing file of the replicated parent virtual disk, the replicated virtual disk will have a parent-child virtual disk relationship with the replicated parent virtual disk. The operation then proceeds to block 426.

Turning back to block 406, if the selected virtual disk is determined to be a non-leaf virtual disk, i.e., a shared read-only virtual disk, then the operation proceeds to block 416, where a dummy virtual machine is created in the private cloud computing environment 102 and attached to the selected virtual disk. Next, at block 418, a replica or an identical copy of the dummy virtual machine is created in the public cloud computing environment 104. Next, at block 420, if the selected virtual disk has a parent virtual disk, a child virtual disk backing file of a replicated parent virtual disk, which is a replicated version of the parent virtual disk for the current virtual disk, is created in the public cloud computing environment 104. However, if the selected virtual disk does not have a parent virtual disk, i.e., the selected virtual disk is the root virtual disk, then a flat virtual disk is created in the public cloud computing environment 104. As used herein, a flat virtual disk is a virtual disk without a parent virtual disk. Next, at block 422, the child virtual disk backing file or the flat virtual disk is attached to the replica of the dummy virtual machine in the public cloud computing environment 104.

Next, at block 424, a replication process is executed for the dummy virtual machine in the private cloud computing environment 102 using the replica of the dummy virtual machine as the target of replication, which results in the selected virtual disk attached to the dummy virtual machine being replicated in the child virtual disk backing file or the flat virtual disk in the public cloud computing environment 104. Thus, the child virtual disk backing file becomes the target of replication for the selected virtual disk. In an embodiment, a vSphere replication may be used as the replication process. As a result, the dummy virtual machine attached to the selected virtual disk is migrated to the public cloud computing environment 104, and the selected virtual disk is replicated at the public cloud computing environment 104. If the selected virtual disk had a parent virtual disk, since the selected virtual disk was replicated using the child virtual disk backing file of the replicated parent virtual disk, the replicated virtual disk will have a parent-child virtual disk relationship with the replicated parent virtual disk. The operation then proceeds to block 426.

Next, at block 426, a determination is made whether the current virtual disk is the last virtual disk for the current level of the linked clone tree structure. If no, then the operation proceeds back to block 404, where another virtual disk for the current level is selected and processed. However, if yes, then the operation proceeds to block 428, where a determination is made whether the current level is the last level for the linked clone tree structure.

If the current level is not the last level of the linked clone tree structure, then the operation proceeds back to block 402, where another level of the linked clone tree structure is selected and processed. However, if the current level is the last level of the linked clone tree structure, then the operation proceeds to block 430, where all dummy virtual machines are removed from the migrated linked clone tree structure in the public cloud computing environment 104. It is noted here that the dummy virtual machines in the private cloud computing environment 102 may be deleted as part of the VM migration process for the dummy virtual machines, as well as other virtual machines and virtual disks in the original linked clone tree structure. Alternatively, the dummy virtual machines in the private cloud computing environment 102, as well as other virtual machines and virtual disks in the original linked clone tree structure, may be deleted when the dummy virtual machines in the migrated linked clone tree structure in the public cloud computing environment 104 are deleted. The operation then comes to an end.

Figure 5A:
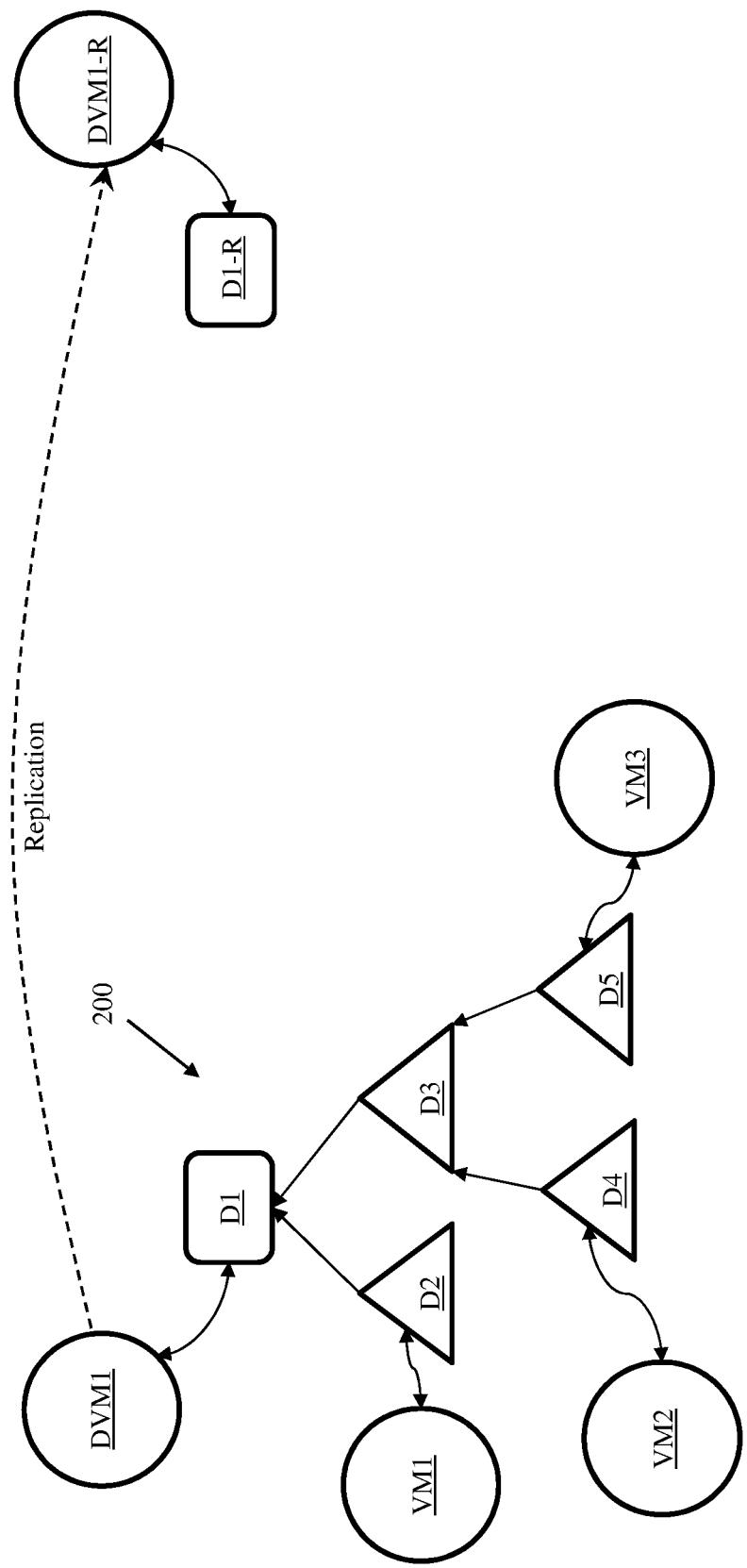
FIGS. 5A-5E illustrate the migrating operation of FIG. 4 on a linked clone tree in accordance with an embodiment of the invention.

This migration operation of a linked clone tree structure will be further illustrated in FIGS. 5A-5E using the linked clone tree structure 200 shown in FIG. 2 as an example. In this example, the linked clone tree structure 200 is being migrated from the private cloud computing environment 102 to the public cloud computing environment 104. As described above, the migration operation begins with the lowest level of a linked clone tree structure and then with subsequently higher levels of the linked clone tree structure. Thus, the migration operation begins with the replication process on the level 0 of the linked clone tree structure 200. FIG. 5A illustrates the replication process on the level 0 of the linked clone tree structure 200, which includes only the root virtual disk. In the linked clone tree structure 200, the root virtual disk is the virtual disk D1, which is a shared read-only virtual disk. Thus, a dummy virtual machine DVM1 is created and the root virtual disk D1 is attached to the newly created dummy disk. The dummy virtual machine DVM1 is not powered on so the data integrity of the virtual disk D1, which is a read-only disk, is not compromised. The dummy virtual machine DVM1 is then replicated in the public cloud computing environment 104 as a dummy virtual machine DVM1-R, which results in the replication of the virtual disk D1 as a replicated virtual disk D1-R in the public cloud computing environment.

Figure 5B:
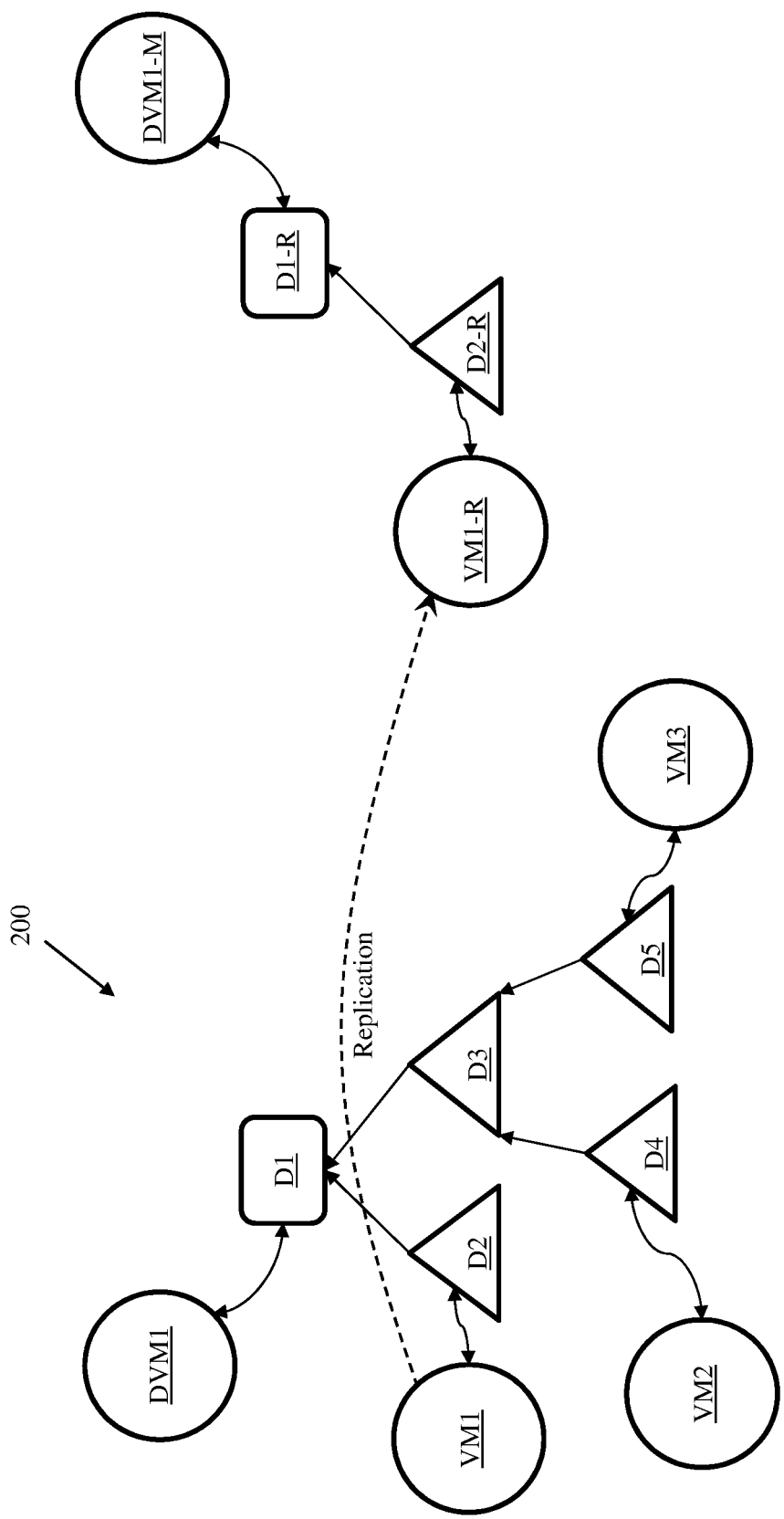
Figure 5C:
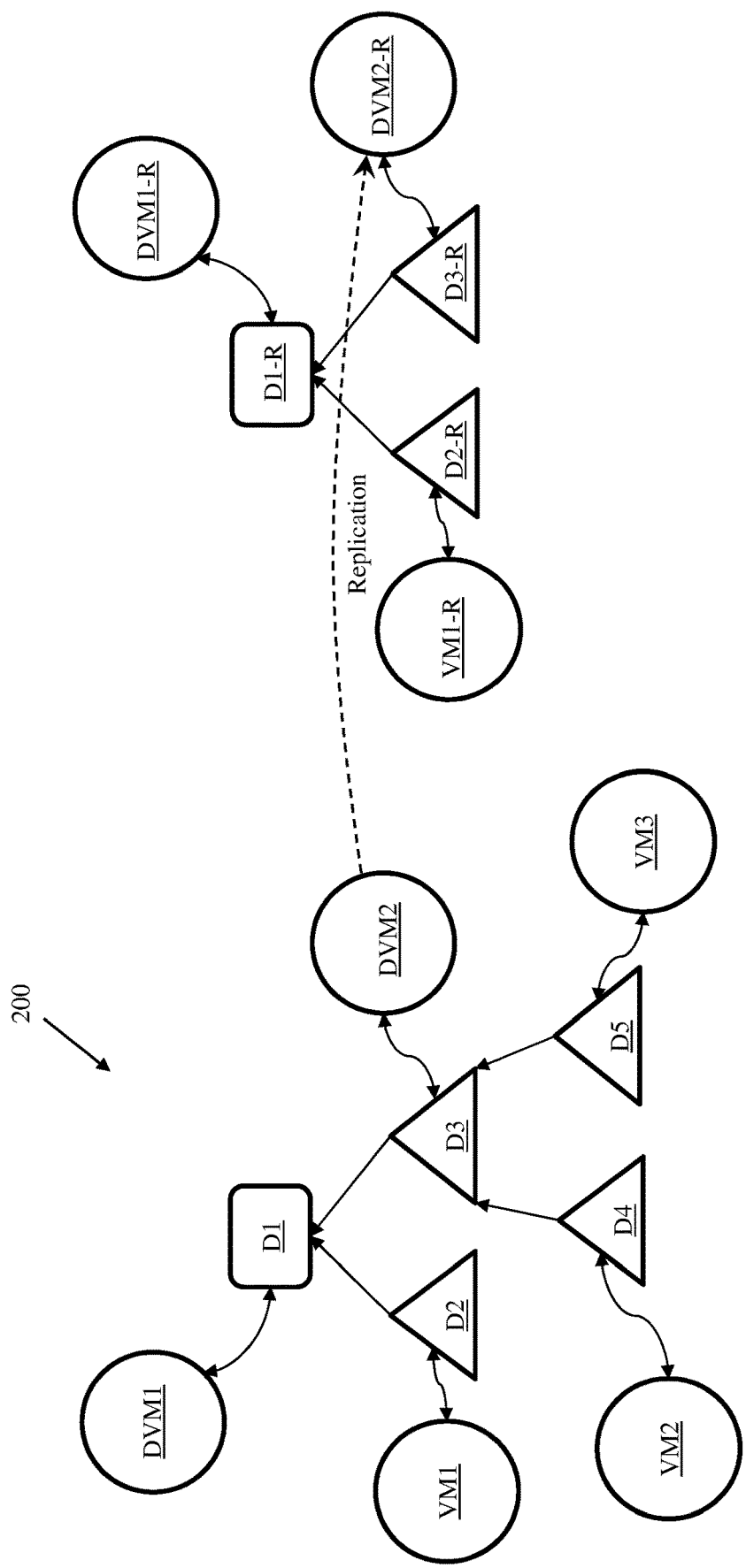

Once the replication process is done for level 0 of the linked clone tree structure 200, the operation then proceeds to the replication process for level 1 of the linked clone tree structure 200. FIGS. 5B and 5C illustrate the replication process for the level 1 of the linked clone tree structure 200. The level 1 of the linked clone tree structure 200 includes the virtual disk D2, which is a leaf virtual disk, and the virtual disk D3, which is a shared read-only virtual disk. As illustrated in FIG. 5B, for the leaf virtual disk D2 (which is attached to the virtual machine VM1), the virtual machine VM1 with the virtual disk D2 is replicated in the public cloud computing environment 104 as a virtual machine VM1-R with a replicated virtual disk D2-R. This VM replication process involves first creating a replica or an identical copy of the virtual machine VM1 in the public cloud computing environment 104 as a virtual machine VM1-R and then creating a child disk backing file of the replicated virtual disk D1-R, which is attached to the virtual machine VM1-R. A replication process for the virtual machine VM1 is then configured so that the virtual machine copy VM1-R is the target of replication, which results in the replication of the virtual disk D2 in the public cloud computing environment 104 as the replicated virtual disk D2-R.

As illustrated in FIG. 5C, for the shared virtual disk D3, the replication process is similar to the virtual disk D1, as illustrated in FIG. 5A. However, in this replication process, a child disk backing (i.e., a child disk of the replicated virtual disk D1-R) is created to replicate the virtual disk D3, which has a parent disk, in the public cloud computing environment 104. First, a dummy virtual machine DVM2 is created and the virtual disk D3 is attached to the newly created dummy disk. The dummy virtual machine DVM2 is not powered on. The dummy virtual machine DVM2 is then replicated in the public cloud computing environment 104 as a dummy virtual machine DVM2-R, which results in the migration of the virtual disk D3 as a replicated virtual disk D3-R in the public cloud computing environment 104 using the child disk backing of the replicated virtual disk D1-R.

Figure 5D:
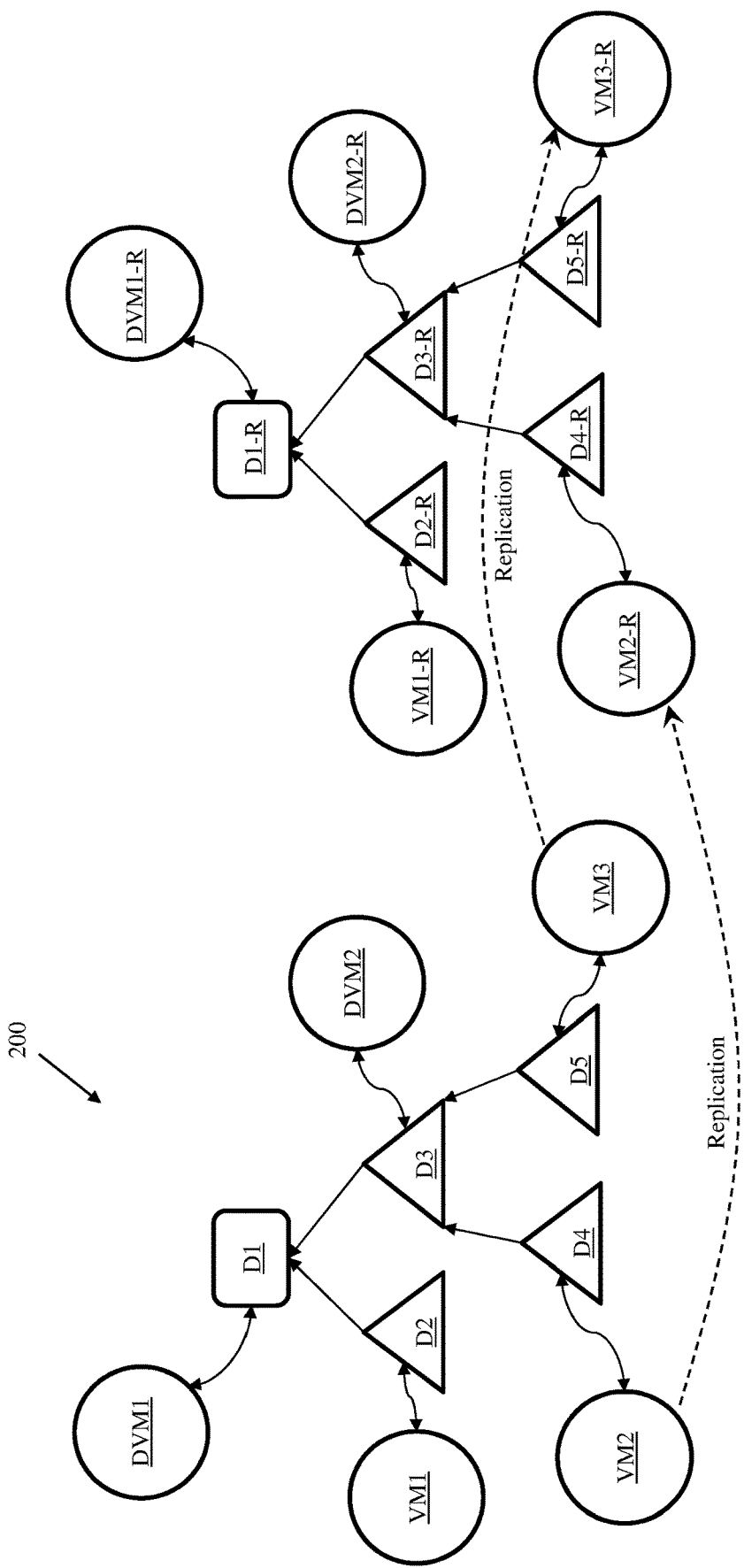

Once the replication process is done for level 1 of the linked clone tree structure 200, the operation then proceeds to the replication process for level 2 of the linked clone tree structure, which is the last level for the linked clone tree structure 200. FIG. 5D illustrates the replication process for the level 2 of the linked clone tree structure 200. The level 2 of the linked clone tree structure 200 includes the virtual disks D4 and D5, which are both leaf virtual disks. Thus, the migration of the virtual disks D4 and D5 is similar to the migration of the virtual disk D2. For the virtual disk D4 (which is attached to the virtual machine VM2), the virtual machine VM2 with the virtual disk D4 is replicated in the public cloud computing environment 104 as a virtual machine VM2-R with a replicated virtual disk D4-R. For the virtual disk D5 (which is attached to the virtual machine VM3), the virtual machine VM3 with the virtual disk D5 is replicated in the public cloud computing environment 104 as a virtual machine VM3-R with a replicated virtual disk D5-R. The result of migrating the virtual machines VM4 and VM5 is shown in FIG. 5D.

Figure 5E:
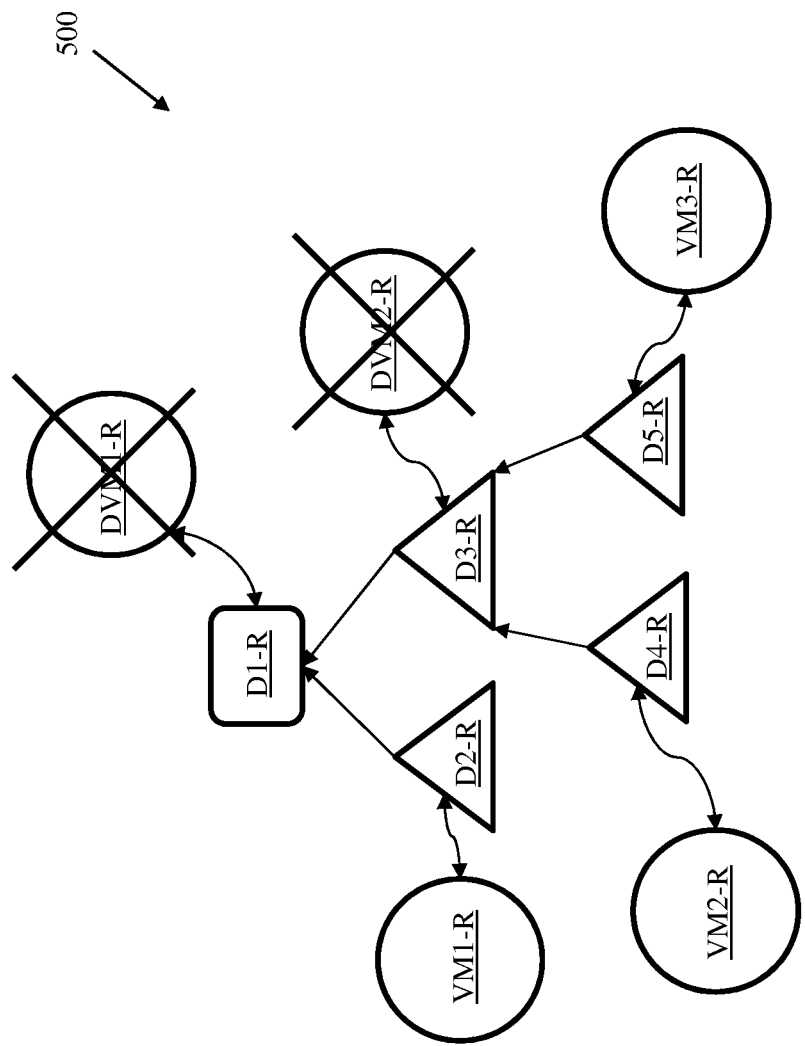

Once the replication process is done for the level 2 of the linked clone tree structure 200, all the virtual disks and the virtual machines in the linked clone tree structure have been replicated in the public cloud computing environment 104 as a replicated linked clone tree structure 500, as illustrated in FIG. 5E. The only step left is the cleanup process of the dummy virtual machines in the replicated linked clone tree structure 500, which is achieved by removing all the dummy virtual machines in the replicated clone tree structure, i.e., the dummy virtual machines DVM1-R and DVM2-R, as illustrated in FIG. 5E. After the dummy virtual machines have been removed, the replicated linked clone tree structure 500 will be identical to the linked clone tree structure 300 shown in FIG. 3B. Thus, the original linked clone tree structure 200 in the private cloud computing environment 102 will have been successfully migrated to the public cloud computing environment 104 without having to repeatedly replicate the same shared virtual disks of the linked clone tree structure, while maintaining the parent-child virtual disk hierarchy of the original linked clone tree structure.

The migrating operation of a linked clone tree structure between the private cloud computing environment 102 and the public cloud environment 104 may be implemented using different algorithms. A pseudo-code for a particular implementation of the migrating procedure, which is named "Level Order—Virtual Disk Replication (LO-VDR)," in accordance with an embodiment of the invention is shown below.

The input to the algorithm is the root disk node (root) of the linked clone tree and the source (src) and destination (dest) cloud references.

Procedure LO-VDR(root, src, dest)
    1. queue = (root)
    2. tmpVms = list( )
    3. While queue.notEmpty( ):
        a. node = queue.head( )
        b. For child ∈ node.getChildren( ): i. queue.add(child)
        c. If not node.isLeaf( ):
            i. tmpVmSrc = createDummyVM(src)
            ii. attachDisk(tmpVmSrc, node.disk)
            iii. tmpVmDest = createDummyVM(dest)
            iv. If node.disk.parent != null:
                1. parentDiskInDest = findReplicaDisk(dest, node.disk.parent)

-continued

The input to the algorithm is the root disk node (root) of the linked clone
tree and the source (src) and destination (dest) cloud references.

```
            2. targetDisk = createChildDiskBacking(parentDiskInDest, node.disk.size)
        v. Else: 1. targetDisk = createFlatDisk(node.disk.size)
        vi. attachDisk(tmpVmDest, targetDisk)
        vii. configureReplication(tmpVmSrc, tmpVmDest)
        viii. tmpVms.add(tmpVmSrc)
        ix. tmpVms.add(tmpVmDest)
        x. waitForReplicationToFinish(tmpVmSrc, tmpVmDest)
    d. Else:
        i. targetVm= createVM(dest, node.vm.spec)
        ii. parentDiskInDest = findReplicaDisk(dest, node.disk.parent
        iii. targetDisk = createChildDiskBacking(parentDiskInDest, node.disk.size)
        iv. attachDisk(targetVm, targetDisk)
        v. configureReplication(node.vm, targetVm)
4. For vm in tmpVms:
    a. deleteVM(vm)
```

The algorithm defined by the above pseudo-code is similar to the operation described above with respect to the process flow diagram of FIG. 4. In the described migration operation and the algorithm defined by the pseudo-code, it was assumed that each virtual machine in a linked clone tree structure being migrated has one delta virtual disk. However, in some embodiments, some or all of the virtual machines in a linked clone tree structure being migrated may be attached to multiple virtual disks, e.g., multiple delta virtual disks. For such embodiments, the migration operation and the algorithm defined by the pseudo-code can be modified to handle the multiple virtual disks of the virtual machines in the linked clone tree structure by ensure all the virtual disks attached to a virtual machine are replicated in the destination environment.

It is noted here that although the migrating operation has been described using a linked clone tree structure as an example, the migrating operation according to embodiments of the invention may be applied to other tree structures having parent-child virtual disk hierarchies and virtual computing instances other than virtual machines, such as virtual containers. In addition, although the migrating operation has been described as being a migration of a linked clone tree structure between the private cloud computing environment 102 and the public cloud computing environment 104, the described migrating operation may be applied to migration of linked clone tree structures between any cloud computing environments, such as one private cloud computing environment to another private cloud computing environment, or one public cloud computing environment to another public cloud computing environment.

Figure 6:
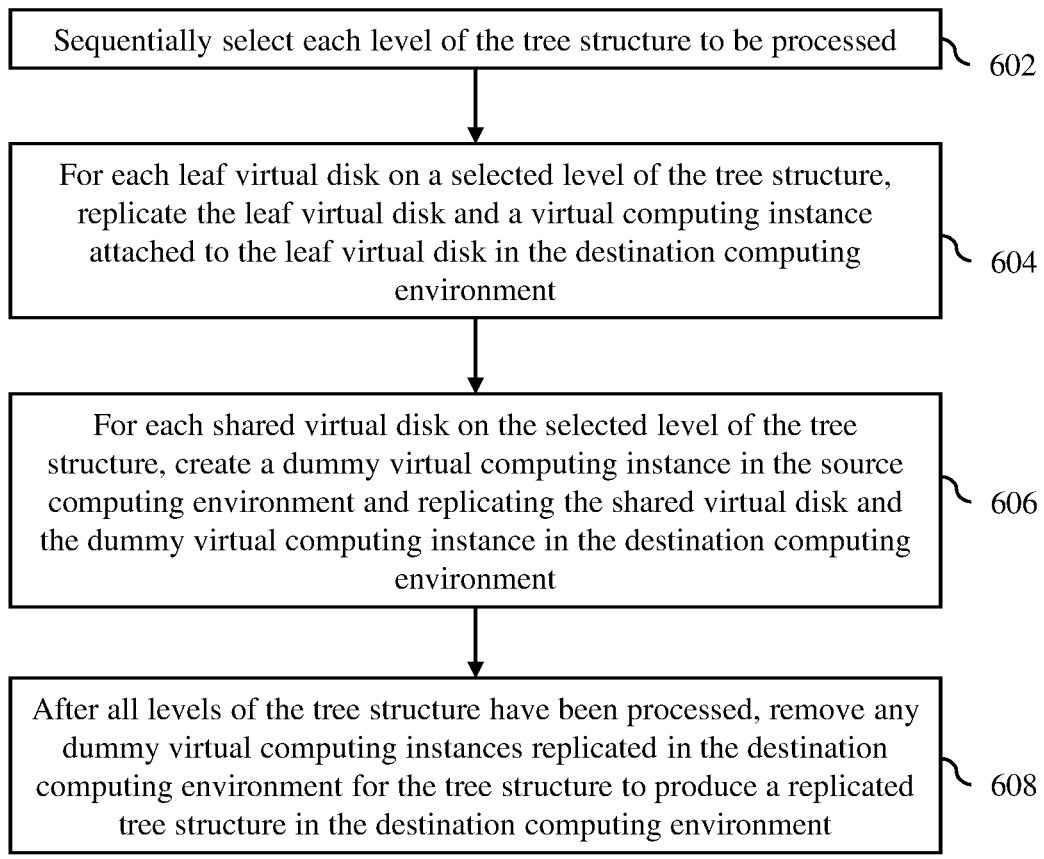
FIG. 6 is a process flow diagram of a computer-implemented method for migrating a tree structure with multiple virtual disks and multiple virtual computing instances from a source computing environment to a destination computing environment in accordance with an embodiment of the invention.

A computer-implemented method for migrating a tree structure with multiple virtual disks and multiple virtual computing instances from a source computing environment to a destination computing environment in accordance with an embodiment of the invention is described with reference to a process flow diagram of FIG. 6. At block 602, each level of the tree structure is sequentially selected to be processed. At block 604, for each leaf virtual disk on a selected level of the tree structure, the leaf virtual disk and a virtual computing instance attached to the leaf virtual disk are replicated in the destination computing environment. At block 606, for each shared virtual disk on the selected level of the tree structure, a dummy virtual computing instance is created in the source computing environment and the shared virtual disk and the dummy virtual computing instance are replicated in the destination computing environment. At block 608, after all the levels of the tree structure have been processed, any dummy virtual computing instances replicated in the destination computing environment for the tree structure are removed to produce a replicated tree structure in the destination computing environment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for migrating a tree structure with multiple virtual disks and multiple virtual computing instances from a source computing environment to a destination computing environment, the method comprising:
   sequentially selecting each level of the tree structure to be processed;
   for each leaf virtual disk on a selected level of the tree structure, replicating the leaf virtual disk and a virtual computing instance attached to the leaf virtual disk in the destination computing environment;
   for each shared virtual disk on the selected level of the tree structure, creating a dummy virtual computing instance in the source computing environment and replicating the shared virtual disk and the dummy virtual computing instance in the destination computing environment; and
   after all levels of the tree structure have been processed, removing any dummy virtual computing instances replicated in the destination computing environment for the tree structure to produce a replicated tree structure in the destination computing environment.

2. The method of claim 1, wherein sequentially selecting each level includes first selecting a level of the tree structure with a root virtual disk to be processed.

3. The method of claim 1, wherein replicating the leaf virtual disk and the virtual computing instance includes replicating the leaf virtual disk in the destination computing environment as a replicated leaf virtual disk having a parent-child relationship with a replicated virtual disk in the destination computing environment that corresponds to a parent virtual disk of the leaf virtual disk in the source computing environment.

4. The method of claim 3, wherein replicating the leaf virtual disk and the virtual computing instance comprises:
   creating a replica of the virtual computing instance in the destination computing environment;
   creating a child virtual disk backing file of the replicated virtual disk in the destination computing environment;
   attaching the child virtual disk backing file to the replica of the virtual computing instance; and
   replicating the leaf virtual disk in the destination computing environment using the child virtual disk backing file as a target of replication.

5. The method of claim 1, wherein replicating the shared virtual disk and the dummy virtual computing instance includes, if the shared virtual disk is not a root virtual disk, replicating the shared virtual disk in the destination computing environment as a replicated shared virtual disk having a parent-child relationship with a replicated virtual disk in the destination computing environment that corresponds to a parent virtual disk of the shared virtual disk in the source computing environment.

6. The method of claim 5, wherein replicating the shared virtual disk in the destination computing environment comprises:
   creating a replica of the dummy virtual computing instance in the destination computing environment;
   creating a child virtual disk backing file of the replicated virtual disk in the destination computing environment;
   attaching the child virtual disk backing file to the replica of the dummy virtual computing instance; and
   replicating the shared virtual disk in the destination computing environment using the child virtual disk backing file as a target of replication.

7. The method of claim 1, wherein at least one of the multiple virtual computing instances in the tree structure is a linked clone.

8. A non-transitory computer-readable storage medium containing program instructions for migrating a tree structure with multiple virtual disks and multiple virtual computing instances from a source computing environment to a destination computing environment, wherein execution of the program instructions by one or more processors causes the one or more processors to perform steps comprising:
   sequentially selecting each level of the tree structure to be processed;
   for each leaf virtual disk on a selected level of the tree structure, replicating the leaf virtual disk and a virtual computing instance attached to the leaf virtual disk in the destination computing environment;
   for each shared virtual disk on the selected level of the tree structure, creating a dummy virtual computing instance in the source computing environment and replicating the shared virtual disk and the dummy virtual computing instance in the destination computing environment; and
   after all levels of the tree structure have been processed, removing any dummy virtual computing instances replicated in the destination computing environment for the tree structure to produce a replicated tree structure in the destination computing environment.

9. The computer-readable storage medium of claim 8, wherein sequentially selecting each level includes first selecting a level of the tree structure with a root virtual disk to be processed.

10. The computer-readable storage medium of claim 8, wherein replicating the leaf virtual disk and the virtual computing instance includes replicating the leaf virtual disk in the destination computing environment as a replicated leaf virtual disk having a parent-child relationship with a replicated virtual disk in the destination computing environment that corresponds to a parent virtual disk of the leaf virtual disk in the source computing environment.

11. The computer-readable storage medium of claim 10, wherein replicating the leaf virtual disk and the virtual computing instance comprises:
   creating a replica of the virtual computing instance in the destination computing environment;
   creating a child virtual disk backing file of the replicated virtual disk in the destination computing environment;
   attaching the child virtual disk backing file to the replica of the virtual computing instance; and
   replicating the leaf virtual disk in the destination computing environment using the child virtual disk backing file as a target of replication.

12. The computer-readable storage medium of claim 8, wherein replicating the shared virtual disk and the dummy virtual computing instance includes if the shared virtual disk is not a root virtual disk, replicating the shared virtual disk in the destination computing environment as a replicated shared virtual disk having a parent-child relationship with a replicated virtual disk in the destination computing environment that corresponds to a parent virtual disk of the shared virtual disk in the source computing environment.

13. The computer-readable storage medium of claim 12, wherein replicating the shared virtual disk in the destination computing environment comprises:
creating a replica of the dummy virtual computing instance in the destination computing environment;
creating a child virtual disk backing file of the replicated virtual disk in the destination computing environment;
attaching the child virtual disk backing file to the replica of the dummy virtual computing instance; and
replicating the shared virtual disk in the destination computing environment using the child virtual disk backing file as a target of replication.

14. The computer-readable storage medium of claim 8, wherein at least one of the multiple virtual computing instances in the tree structure is a linked clone.

15. A system of multiple computing environments having a tree structure with multiple virtual disks and multiple virtual computing instances, the system comprising:
memory; and
one or more processors configured to:
sequentially select each level of the tree structure to be processed for migration from a source computing environment to a destination computing environment;
for each leaf virtual disk on a selected level of the tree structure, replicate the leaf virtual disk and a virtual computing instance attached to the leaf virtual disk in the destination computing environment;
for each shared virtual disk on the selected level of the tree structure, create a dummy virtual computing instance in the source computing environment and replicating the shared virtual disk and the dummy virtual computing instance in the destination computing environment; and
after all levels of the tree structure have been processed, remove any dummy virtual computing instances replicated in the destination computing environment for the tree structure to produce a replicated tree structure in the destination computing environment.

16. The system of claim 15, wherein the one or more processors are configured to first select a level of the tree structure with a root virtual disk to be processed.

17. The system of claim 15, wherein the one or more processors are configured to replicate the leaf virtual disk in the destination computing environment as a replicated leaf virtual disk having a parent-child relationship with a replicated virtual disk in the destination computing environment that corresponds to a parent virtual disk of the leaf virtual disk in the source computing environment.

18. The system of claim 17, wherein the one or more processors are configured to:
create a replica of the virtual computing instance in the destination computing environment;
create a child virtual disk backing file of the replicated virtual disk in the destination computing environment;
attach the child virtual disk backing file to the replica of the virtual computing instance; and
replicate the leaf virtual disk in the destination computing environment using the child virtual disk backing file as a target of replication.

19. The system of claim 15, wherein the one or more processors are configured to, if the shared virtual disk is not a root virtual disk, replicate the shared virtual disk in the destination computing environment as a replicated shared virtual disk having a parent-child relationship with a replicated virtual disk in the destination computing environment that corresponds to a parent virtual disk of the shared virtual disk in the source computing environment.

20. The system of claim 19, wherein the one or more processors are configured to:
create a replica of the dummy virtual computing instance in the destination computing environment;
create a child virtual disk backing file of the replicated virtual disk in the destination computing environment;
attach the child virtual disk backing file to the replica of the dummy virtual computing instance; and
replicate the shared virtual disk in the destination computing environment using the child virtual disk backing file as a target of replication.

* * * * *